United States Patent
Decker, Jr.

(10) Patent No.: US 7,370,428 B2
(45) Date of Patent: May 13, 2008

(54) PARKING AREA LEVEL INDICATION DEVICE

(75) Inventor: Daniel L. Decker, Jr., Castle Rock, CO (US)

(73) Assignee: B & D Manufacturing, Inc., Sedalia, CO (US)

( * ) Notice: Subject to any disclaimer, the term of this patent is extended or adjusted under 35 U.S.C. 154(b) by 0 days.

(21) Appl. No.: 11/422,345

(22) Filed: Jun. 6, 2006

(65) Prior Publication Data
US 2007/0245579 A1 Oct. 25, 2007

Related U.S. Application Data

(63) Continuation-in-part of application No. 29/246,567, filed on Apr. 24, 2006, now Pat. No. Des. 544,672.

(51) Int. Cl.
*G01C 9/06* (2006.01)

(52) U.S. Cl. ................. 33/366.11; 33/390; 340/689

(58) Field of Classification Search ........... 33/366.11, 33/366.12, 366.13, 390; 73/514.01; 340/545.5, 340/689, 669, 671
See application file for complete search history.

(56) References Cited

U.S. PATENT DOCUMENTS

| | | | |
|---|---|---|---|
| 3,290,786 A * | 12/1966 | Parkin | 33/366.12 |
| 4,745,687 A * | 5/1988 | Wilhelmy | 33/390 |
| 5,046,587 A | 9/1991 | Jones | |
| 5,136,784 A | 8/1992 | Marantz | |
| 5,159,761 A | 11/1992 | Cagan et al. | |
| 5,458,315 A | 10/1995 | Blatz et al. | |
| 5,488,779 A | 2/1996 | Schultheis | |
| 5,592,745 A * | 1/1997 | Heger et al. | 33/366.12 |
| 5,610,575 A | 3/1997 | Gioutsos | |
| 5,956,260 A | 9/1999 | Heger | |
| 6,002,974 A | 12/1999 | Schifferan | |
| 6,104,307 A * | 8/2000 | Hanratty | 340/689 |
| D444,286 S | 6/2001 | Ahne | |
| 6,268,794 B1 | 7/2001 | Tzanev | |
| 6,456,194 B1 | 9/2002 | Carlson | |
| 6,526,668 B1 | 3/2003 | Beckhart et al. | |
| 6,836,972 B2 | 1/2005 | Drahos et al. | |
| 6,995,680 B2 * | 2/2006 | Fong | 340/689 |

(Continued)

FOREIGN PATENT DOCUMENTS

DE 4336922 5/1995

(Continued)

*Primary Examiner*—G. Bradley Bennett
(74) *Attorney, Agent, or Firm*—Sheridan Ross P.C.

(57) ABSTRACT

A potential parking area level indicator is provided that includes a centralized hub with a plurality of arms depending therefrom. Preferably, four arms are provided that are spaced 90 degrees from each other thereby defining two sets of opposing arms. In operation, a driver of an RV would locate the level indicator on a potential parking area thereby placing the arms onto the potential parking surface. If the line defined by a pair of opposed arms is placed on a generally level area, indicator lights will illuminate indicating that fact. If, however, the line defined by opposing arms is placed on a grade that is not acceptable for parking, the indicator lights will not illuminate showing that the potential parking area is unsafe for parking. Proper illumination of the lights is driven by accelerometers incorporated into the arms of the level indicator.

35 Claims, 3 Drawing Sheets

U.S. PATENT DOCUMENTS

| | | |
|---|---|---|
| 7,040,603 B1 | 5/2006 | Tai |
| 2004/0256815 A1 | 12/2004 | Eichhorn |
| 2007/0120707 A1* | 5/2007 | Donnelly et al. ........... 340/933 |
| 2007/0146154 A1* | 6/2007 | Teller ......................... 340/689 |
| 2007/0180719 A1* | 8/2007 | Donnelly et al. ........ 33/366.11 |

FOREIGN PATENT DOCUMENTS

| | | |
|---|---|---|
| EP | 0430813 | 6/1991 |

* cited by examiner

PARKING AREA LEVEL INDICATION DEVICE

The present invention is a continuation-in-part of U.S. Design patent application Ser. No. 29/246,567, filed Apr. 24, 2006 now U.S. Pat. No. D,544,672, which is incorporated by reference in its entirety herein.

FIELD OF THE INVENTION

The present invention relates generally to a device for measuring the grade of a potential parking area. More specifically, embodiments of the present invention are used prior to parking on an unfamiliar location wherein the operator can quickly ascertain the relative slope of the potential parking space to ensure the area is safe for parking.

BACKGROUND OF THE INVENTION

Travel by recreational vehicles (hereinafter "RV") has been a popular pastime such that on any given day thousands of RVs are on the nation's roads. An RV is generally a self contained mobile home that includes areas for cooking, living and sleeping, among other things. Generally, owners of RVs enjoy touring and parking at or near locations of interest, such as national parks, wherein RVs are often parked in preset parking or camping areas, for example. Unfortunately some camping locations do not provide a stable and level parking area for the RV. Thus it is the RV operator's responsibility to ascertain whether or not the potential parking area is a level and safe place to park the RV.

Ascertaining whether a potential parking area has an acceptable grade to park an RV is very important since RVs generally have a relatively high center of gravity. More specifically, as is well known in the art, the higher the center of gravity of an object, generally the less statically stable that object. A higher center of gravity equates to a higher risk of the RV tipping if it is parked in a less than ideal parking area. Further, RVs generally have a large aerodynamic profile wherein cross wind loads can adversely affect the stability and further exacerbate the risk of tipping a stationary RV. Even if the risk of tipping is slight, inclinations of the RV may make the interior cabin inhospitable to the individuals using it, wherein dishes, cups, or other items are apt to slide off the tables, for example. In addition, sleeping on an inclined bed or sitting in an inclined chair may be uncomfortable and/or dangerous.

The monitoring and display of the roll and pitch angle of a vehicle has been disclosed in the prior art. More specifically, U.S. Pat. No. 5,136,784 to Marantz (hereinafter "Marantz") teaches a vehicle level indicator that is permanently interconnected to the vehicle. The Marantz device and devices similar thereto display the roll and pitch angle of the vehicle at any given time, especially when in motion. Further, these devices are generally used to alert the driver of an unsafe driving condition, such as tipping, thereby allowing the driver to make corrective speed and/or steering adjustments. One drawback to devices of the prior art is that they are not autonomous and are permanently interconnected to the vehicle. Thus in order to ascertain whether a potential parking area is acceptable, the operator must position the RV onto the potential parking area and assess the roll and pitch angle of the vehicle. As it will be understood, this process is potentially dangerous if, for example, the potential parking area being assessed is inherently unsafe.

Further, U.S. Patent Publication No. 2004/0256815 to Eichhorn (hereinafter "Eichhorn") teaches a system for automatically leveling an RV. More specifically, Elchhorn discloses the use of pneumatically driven jacks that are interconnected to a roll and pitch sensing device. Once the device senses roll and tilt angle of a parked vehicle, the pneumatically driven jacks lift the vehicle such that the roll and tilt angle of the vehicle are placed within an acceptable range. Again, the device of Eichhorn is not autonomous such that it is always interconnected to the vehicle. Further, as in Marantz, in order to initiate leveling, the RV must be parked, at least for a small amount of time, in a less than ideal parking area.

Thus it is a long felt need in the field of recreational vehicle safety to provide an autonomous level indicating device that is easy to use and quickly indicates whether a potential parking area is level prior to positioning the RV onto that area. The following disclosure describes an improved level indication device that is autonomous, easily placed on a potential parking area, and that quickly indicates whether the desired parking area is acceptable and safe.

SUMMARY OF THE INVENTION

It is one aspect of the present invention to provide a lightweight easy to use and autonomous level indication device. More specifically, embodiments of the present invention include a centralized hub with a plurality of arms depending therefrom. Each arm includes an indicator such as a light, that allows the operator of the RV to quickly ascertain the slope of the potential parking area when the leveling indication device is placed on a potential parking location. The indicator lights of embodiments of the present invention are preferably light emitting diodes, however one skilled in the art will appreciate that light bulbs may be employed as well. Generally, the present invention employs an accelerometer positioned in each of the arms to secure the pull of gravity that is communicated to the indicator light.

It is another aspect of the present invention to provide indicators integrated onto the arms of the level indicator. More specifically, as described above, indicator lights are employed adjacent to the tips of the arms of one embodiment of the present invention. These indicator lights may illuminate when the arm on which it rests is out of a predetermined threshold of level. Alternatively, it is also contemplated that embodiments of the present invention will utilize indicator lights that are extinguished when the arm on which it rests is not level. It is also contemplated that different degrees of light may be utilized to illustrate varying degrees of grade. Further, one skilled in the art will appreciate that other lighting methods may be employed, such as different color lights to indicate level or non-level conditions. For example, one embodiment of the present invention is carried in the RV and employs lights that flash red at a predetermined rate when the RV is not level, the more un-level the faster the lights flash. As the RV is transitioned to an acceptable orientation, i.e., by jacks or lifts, the lights will flash less frequently. Once the RV is leveled, the lights either cease flashing or are illuminated in green. One skilled in the art will also appreciate that each arm may have integrated selective illumination that will indicate that the RV is in an acceptable orientation. In addition sound may be used to notify the RV operator of the acceptability of a potential parking area.

Although the indicator lights have been described as incorporated into the arms of the level indication device, one skilled in the art will appreciate that other level indication schemes may be employed without departing from the scope of the invention. That is, one embodiment of the present amendment includes indicator lights associated with the level sensors. For example, it is within the scope of the present invention to provide a device wherein the level sensors are separated from the indication devices. Thus, in operation, one individual can leave the RV and place a housing that includes the level sensors onto a potential parking area while another individual is situated in the RV wherein information related to the slope of the potential parking area is transmitted thereto. Further, slope information may be transmitted wirelessly to a hand held device such that the individual situated on the potential parking area can move from place to place while the individual situated in the RV can assess the acceptability of the entire potential parking area without leaving the RV.

It is still yet another aspect of the present invention to provide a level indicator that is easy to manufacture. More specifically, it is contemplated that embodiments of the present invention are generally comprised of an upper housing and a lower housing made of a moldable material, such as plastic. Thus level indicators as contemplated herein may be shaped to any aesthetically pleasing shape and color.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
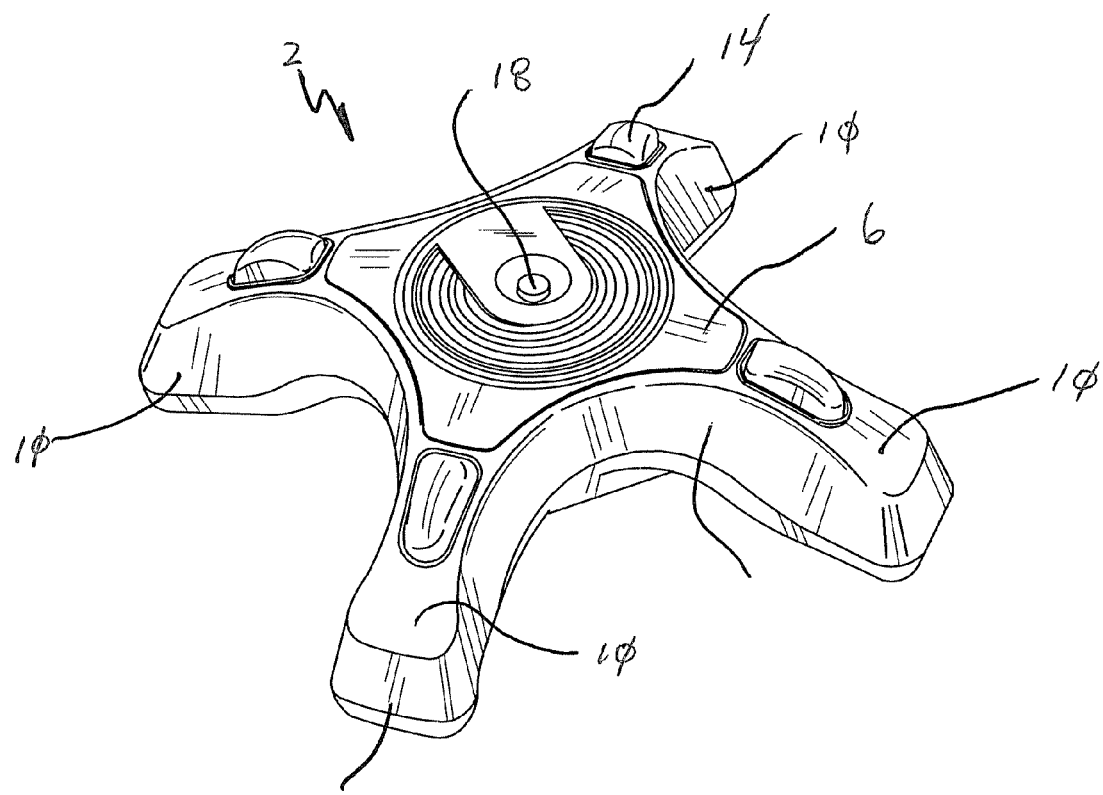
FIG. 1 is a top perspective view of one embodiment of the present invention.
Figure 2:
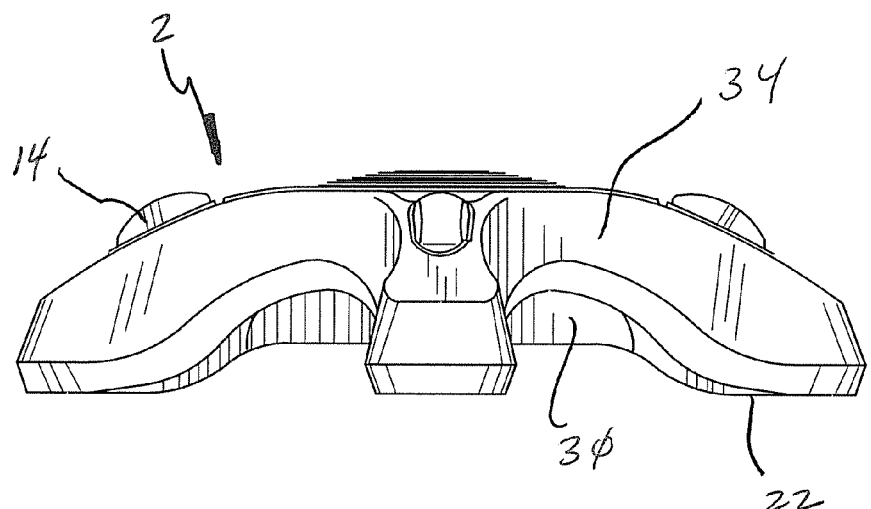
FIG. 2 is a front elevation view of one embodiment of the present invention.
Figure 3:
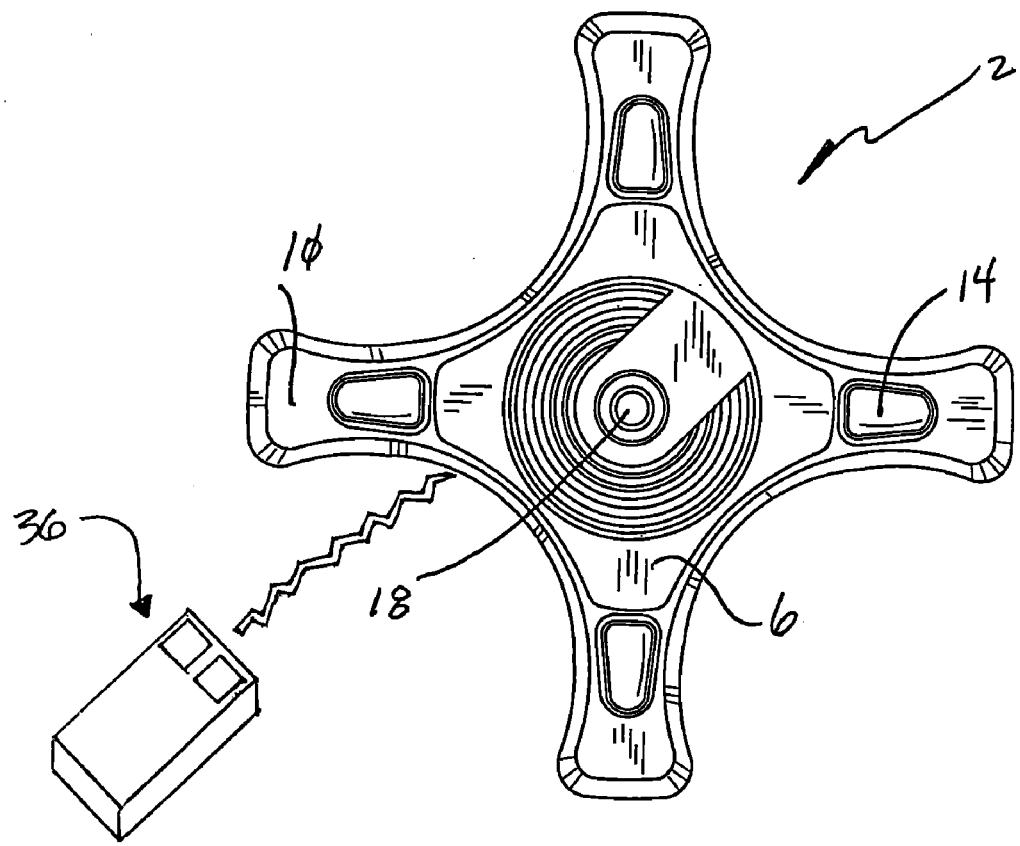
FIG. 3 is a top plan view of one embodiment of the present invention.
Figure 4:
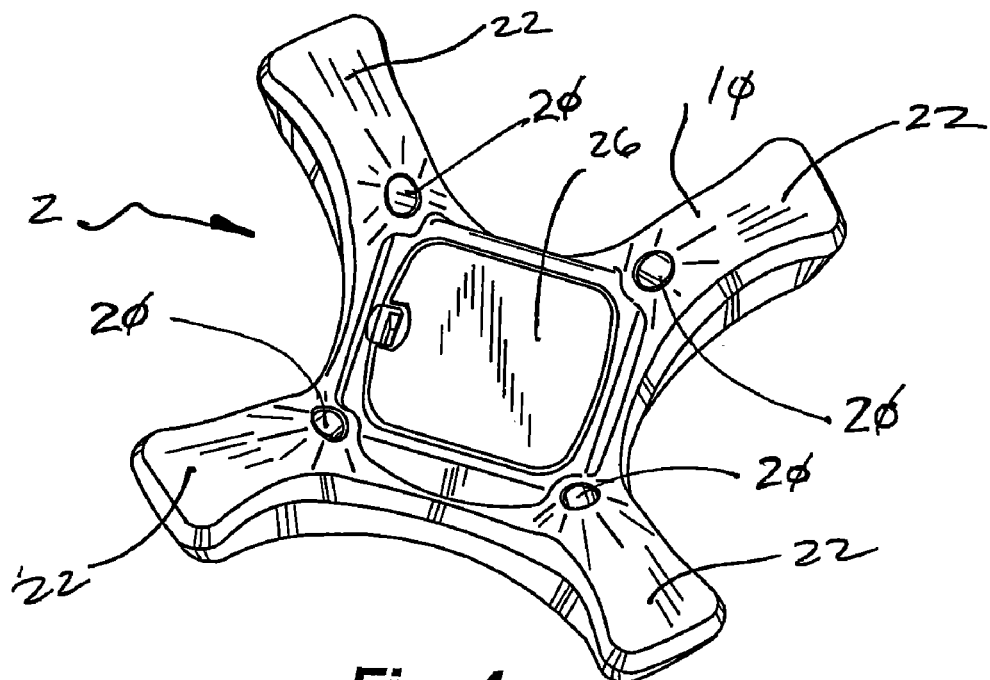
FIG. 4 is a bottom perspective view of one embodiment of the present invention.

It should be understood that the drawings are not necessarily to scale. In certain instances, details that are not necessary for an understanding of the invention or which render other details difficult to perceive may have been omitted. It should be understood, of course, that the invention is not limited to the particular embodiments illustrated herein.

To assist in the understanding of the present invention the following list of components and associated numbering found in the drawings is provided herein:

| Component | # |
|---|---|
| Level indicator | 2 |
| Hub | 6 |
| Arm | 10 |
| Indicator light | 14 |
| On/off switch | 18 |
| Pad | 22 |
| Cover | 26 |
| Lower housing | 30 |
| Upper housing | 34 |
| Tip | 38 |

DETAILED DESCRIPTION

Referring now to FIGS. 1-5, one embodiment of the present invention is shown. More specifically, a level indicator 2 comprised of a hub 6 with a plurality of arms 10 depending therefrom is used to ascertain the level of a potential parking area. Each arm 10 includes at least one indicator light 14. The hub also includes an on/off switch 18. Inside each arm 10 or, alternatively, in the hub 6 is an accelerometer that senses the pull of gravity. Under each arm 10 is a pad 22 for engagement with the potential parking area. Preferably, the level indicator 2 is powered by at least one battery that is accessed through a cover 26 integrated into a lower housing 30 of the level indicator 2.

When the device 2 is positioned on a generally level area, the accelerometer will sense an acceleration due to gravity. If the lateral component of the acceleration is acceptable, the indicator light 14 will be illuminated. That is, in an ideally level parking area a three-axis accelerometer will sense 1 g of acceleration in one direction (z) and 0 gs of acceleration in the other two directions (x and y). However, when an arm 10 is positioned at an angle relative to a horizontal plane, for example 30°, the sensed acceleration will be 0.5 gs, 0.866 gs and 0 gs in the z, x and y directions, respectively. If the drop in sensed acceleration in the z direction is from 1 g to 0.86 gs, which indicates a potential parking area that is sloped about 30°, is acceptable the indicators 14 will illuminate, extinguish, or alter in color depending on the embodiment of the invention and/or the user's preferences. As one skilled in the art will appreciate, the acceptability of the slope angle of a potential parking area is assessed by comparing the sensed acceleration in at least one direction to a preset or selectively alterable threshold. As will also be appreciated by one skilled in the art, only a single acceleration sensor may be employed without departing from the scope of the invention. Preferably, one embodiment of the present invention includes a centralized hub 6 with four arms 10 depending therefrom at 90°increments. Each arm 10 preferably includes the accelerometer 20 positioned adjacent to the tip 38 of the arm furthest away from the hub 6. When the level indicator is placed on a potential parking area, pads 22 of the arms 10 will be in contact with the ground. If one of two opposing arms 10 is positioned higher or lower than its counterpart, the indicator lights will illuminate or extinguish making the unacceptability of the parking area apparent to the operator of the vehicle. If, however, an arm 10 is substantially aligned with its counterpart, indicator lights can also make this fact apparent to the operator thereby informing him or her that in at least one direction, the parking area is at an acceptable grade. Then, since there are preferably four arms 10, the operator typically must also ascertain whether or not the other pair of arms indicate a level or non-level condition. Only when all four arms 10 indicate a level condition will the operator of the RV know that the portion of the potential parking area is acceptable for parking. Ideally, the sensed acceleration would be about 1 g reading on the accelerometer 20 thereby indicating a level surface. However, a slight grade may be acceptable for parking depending on the size of the RV. Thus one skilled in the art will appreciate that the other level indicator 2 may include internally programmed parameters to allow for less than ideal parking conditions. In addition, due to the size of the level indicator 2 with respect to the size of an RV, one skilled in the art will appreciate that many sub-readings may be required for a large parking area to ensure the entire parking area required is acceptable. In one embodiment the level indicator 2 is remotely controlled by a remote control device 36.

Although described herein, four arms 10 have been described, one skilled in the art will appreciate that any number of arms 10 may be used. More specifically, some accelerometers are adapted to measure accelerations in at least three directions. Thus, it should be well understood that a single accelerometer may be employed within the hub 6 of the level indicator 2 such that information related to level in all three directions can be sent to the indicator lights 14 to indicate the direction of the slope. More specifically, it is well within the scope of the invention to provide microelectrical mechanical system (MEMS) accelerometers that include a ring of material that is fixed to a stationary object, such as the housing of the level indicator. A suspended, movable mass is interconnected via a plurality of members to inside surface of the outer ring of material. As the MEMS accelerometer is acted on by gravity, inertia causes the resting suspended mass to move relative to the outer ring thereby stressing the plurality of members that connect the mass to the ring. The members are doped with a piezoelectric material that creates a voltage difference within the members when loaded. The amount of voltage difference across each of the members is measured to ultimately yield the magnitude of acceleration. When the MEMS accelerometer is at rest on a flat surface, the acceleration measured by the accelerometer should be about 1 g, where 1 g equals force of gravity 9.8 meters per second squared. That is, the suspended mass of the MEMS accelerometer will be acted on by gravity and displaced downwardly from the outer ring causing the reading of 1 g acceleration, which would indicate a level area. Conversely, when a level indicator 2 is positioned at any angle, less than 1 g will be sensed by the MEMS accelerometer in any one direction, thereby indicating a non-level condition. Other MEMS accelerometers exist that include a movable mass with a plurality of fingers emanating therefrom that interact with stationary fingers interconnected to a substrate. When at rest, a uniform gap exists between each pair of movable and stationary fingers. When the mass of the accelerometer moves with respect to stationary fingers, the gap between each set of fingers is either increased or decreased. The pairs of fingers function as capacitors, altering the space therebetween changes the capacitance, which, in turn, is measured to identify the magnitude of acceleration. One skilled in the art will appreciate that other types of acceleration measuring devices maybe used such as piezo-film, metro-mechanical-servo, no balance, strain gauge, magnetic induction, optical, and surface acoustic wave, to name a few. In one embodiment of the present invention batteries are used to provide energy to the indicator lights and to the accelerometer, if necessary.

Figure 5:
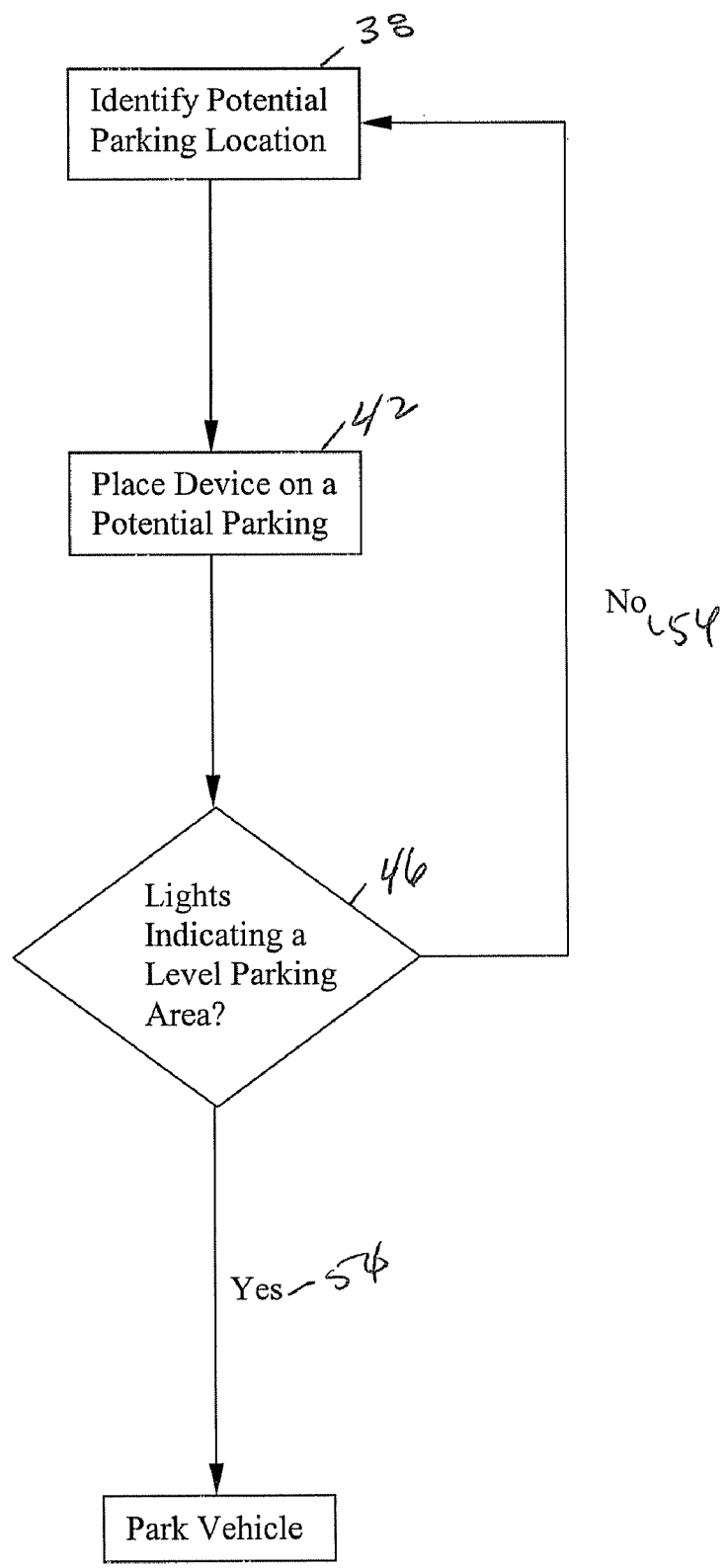
FIG. 5 is a flow chart showing the use of one embodiment of the present invention.

Referring now to FIG. 5, one method of utilizing one embodiment of the present invention is shown and described. More specifically, once a potential parking location is identified 38, the level indicator is placed thereon 42 and the level indicator is turned on via the on/off switch. The accelerometer(s) inside the level indicator then senses the local gravitational pull. If the sensed gravitational pull is within a preset range, a "level" condition exists and an indicator light will illuminate 46. If, however, the gravitational pull on the accelerometer is such that a non-ideal slope is apparent, an indicator light will either be extinguished or be illuminated with a different color, such as red. Once all four indicator lights are illuminated 50 or a color is displayed that indicates a level condition, the operator will know that the local area being tested is acceptable for parking. If, however, the indicator lights are not illuminated 54 in such a fashion to indicate a level condition, another potential parking spot is identified 38 and the process is repeated until an acceptable parking area is ascertained. Again, since the level indicator is smaller compared to any potential parking area, this process may have to be repeated a number of times until the larger parking area is deemed to be acceptable for parking of the vehicle. Once a safe area has been identified, the level indicator is turned off with the on/off switch and stored.

One skilled in the art will appreciate that the level indicator may be located in the RV prior to parking on a potential parking area. The level indicator would then be activated wherein the accelerometer(s) inside the level indicator senses the local gravitational pull. If the sensed gravitational pull is within a preset range, a "level" condition exists and an indicator light will illuminate green. If, however, the gravitational pull on the accelerometer is such that the RV is located on a non-ideal slope, the indicator lights will flash red at a predetermined rate, the less ideal the parking area the less time between red flashes. As the RV is positioned with lifts and/or jacks to a level orientation, the lights will flash less frequently until an acceptable level is reached. Once the RV is level, all four indicator lights are illuminated green and the operator will know to cease orientation of the RV.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A parking area level indicating device, comprising:
   a centralized hub;
   at least two pairs of arms depending from the hub;
   an indicator light associated with each of the at least two pairs of arms, the indicator light being in communication with an acceleration measuring device, and
   wherein when the acceleration measuring device measures a first acceleration the indicator light is illuminated and when the acceleration measuring device measures a second acceleration the indicator light is not illuminated thereby indicating at least one of an acceptable parking space and a non-acceptable parking space.

2. The device of claim 1, wherein the indicator light is comprised of at least one of a light emitting diode and a bulb.

3. The device of claim 1, further comprising an on/off device that directs electricity to at least one of the acceleration measuring device and to the indicator light.

4. The device of claim 3, wherein the source of the electricity is at least one battery.

5. The device of claim 1, wherein the acceleration device is a MEMS accelerometer.

6. The device of claim 1, wherein the acceleration measuring device is a decelerometer.

7. The device of claim 1, the at least two pairs of arms comprising a first arm, a second arm, a third arm and a fourth arm that depend from the hub, each associated with an acceleration measuring device and an indicator light, and wherein the third arm is positioned opposite from the first arm and the second arm is positioned opposite from the fourth arm.

8. The device of claim 7, wherein the arms and the hub are defined by an upper housing and a lower housing, the lower housing having a cover that provides access to at least one battery.

9. The device of claim 1, wherein the parking level indicator is remotely controlled.

10. The device of claim 1, further including a remote control and display device for communication with the acceleration measuring device.

11. The device of claim 1, wherein the indicator light is incorporated into the arm.

12. A parking area level indicating device, comprising:
a centralized hub;
at least two pairs of arms depending from the hub;
a level indicator means associated with each of the at least two pairs of arms, the level indicator area being in communication to an acceleration measuring means, and
wherein when the acceleration measuring means measures a first acceleration the level indicator means is illuminated and when the acceleration measuring means measures a second acceleration the level indicator means is not illuminated thereby indicating at least one of an acceptable parking position and a non-acceptable parking position.

13. The device of claim 12, wherein the level indicator means is comprised of at least one of a light emitting diode and a bulb.

14. The device of claim 12, further comprising an on/off switch that directs electricity to the acceleration measuring means and to the level means.

15. The device of claim 12, wherein the source of the electricity is a battery.

16. The device of claim 12, wherein the acceleration means is a MEMS accelerometer.

17. The device of claim 12, wherein the acceleration measuring means is a decelerometer.

18. The device of claim 12, the at least two pairs of arms comprising a first arm, a second arm, a third arm and a fourth arm that depend from the hub, each associated with an acceleration measuring means and a level indicator means, and wherein the third arm is positioned opposite from the first arm and the second arm is positioned opposite from the fourth arm.

19. The device of claim 12, further comprising a sound emission means incorporation into the hub that is in communication with the acceleration measuring means.

20. A method of assessing the grade of a potential parking area comprising:
identifying a potential parking area;
placing an autonomous, transportable level indication device on the potential parking area; and
assessing information related to the level of the potential parking area.

21. The method of claim 20, wherein the placing further comprises:
energizing pads of the level indication device onto a portion of the potential parking area.

22. The method of claim 20, further comprising sensing gravitational pull with an accelerometer.

23. The method of claim 20, further comprising indicating to an operator of the leveling device that the potential parking area is at least one of acceptable and not acceptable.

24. A parking position level indicating device, comprising:
a centralized hub;
at least two pairs of arms depending from the hub;
an indicator light associated with each of the at least two pairs of arms, the indicator light being in communication with an acceleration measuring device, and
wherein when the acceleration measuring device measures a first acceleration the indicator light flashes a first color at a predetermined rate and when the acceleration measuring device measures a second acceleration the indicator light is illuminated a second color thereby indicating at least one of an acceptable parking position.

25. The device of claim 24, wherein the indicator light flashes at a second predetermined rate that is slower than the predetermined rate when the acceleration measuring device measures an acceleration that is between the first acceleration and the second acceleration.

26. The device of claim 24, wherein the indicator light is comprised of at least one of a light emitting diode and a bulb.

27. The device of claim 24, further comprising an on/off device that directs electricity to at least one of the acceleration measuring device and to the indicator light.

28. The device of claim 27, wherein the source of the electricity is at least one battery.

29. The device of claim 24, wherein the acceleration device is a MEMS accelerometer.

30. The device of claim 24, wherein the acceleration measuring device is a decelerometer.

31. The device of claim 24, the at least two pairs of arms comprising a first arm, a second arm, a third arm and a fourth arm that depend from the hub, each associated with an acceleration measuring device and an indicator light, and wherein the third arm is positioned opposite from the first arm and the second arm is positioned opposite from the fourth arm.

32. The device of claim 31, wherein the arms and the hub are defined by an upper housing and a lower housing, the lower housing having a cover that provides access to at least one battery.

33. The device of claim 24, wherein the parking level indicator is remotely controlled.

34. The device of claim 24, further including a remote control and display device for communication with the acceleration measuring device.

35. The device of claim 24, wherein the indicator light is incorporated into the arm.

* * * * *